(12) United States Patent
Bloy et al.

(10) Patent No.: US 11,367,059 B2
(45) Date of Patent: Jun. 21, 2022

(54) INTEGRATED CREDIT APPLICATION AND MERCHANT TRANSACTION INCLUDING CONCURRENT VISUALIZATION OF TRANSACTION DETAILS

(71) Applicant: The Toronto-Dominion Bank, Toronto (CA)

(72) Inventors: Adrian Bloy, Ottawa (CA); Morgan Klein-MacNeil, Toronto (CA); Alan Tam, Markham (CA); Trevor Ross Gimbel, Mississauga (CA); Julianne Helen Fong, Toronto (CA); Sonali Suresh Nagarkar, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/670,427

(22) Filed: Oct. 31, 2019

(65) Prior Publication Data

US 2021/0133704 A1 May 6, 2021

(51) Int. Cl.
*G06Q 20/10* (2012.01)
*G06Q 20/24* (2012.01)
*G06Q 20/38* (2012.01)

(52) U.S. Cl.
CPC ........... *G06Q 20/102* (2013.01); *G06Q 20/24* (2013.01); *G06Q 20/382* (2013.01)

(58) Field of Classification Search
CPC .................................................. G06Q 20/102
See application file for complete search history.

(56) References Cited

U.S. PATENT DOCUMENTS 5,699,527 A 12/1997 Davidson
6,088,686 A 7/2000 Walker et al.
(Continued)

FOREIGN PATENT DOCUMENTS

WO WO-2005010731 A2 * 2/2005 ............. G06Q 40/00

OTHER PUBLICATIONS

"Chan et al., Designing a Credit Approval System using Web Services, BPEL, and AJAX, 2009, IEEE, 2009 IEEE International Conference on e-Business Engineering, entire document" (Year: 2009).*

(Continued)

*Primary Examiner* — Hani M Kazimi
*Assistant Examiner* — Adam Hilmantel
(74) *Attorney, Agent, or Firm* — Fish & Richardson P.C.

(57) ABSTRACT

The present disclosure involves systems, software, and computer-implemented methods for integrating immediate credit application processes and decisions via a financial institution into ongoing transactions performed at a merchant system. One example method includes receiving a request for new credit account associated with an ongoing transaction at a second system, the request associated with a transaction payload including a session ID and a set of transaction information. A digital credit application is presented, and at least some of the set of transaction information is presented concurrently with the digital credit application. In response to approving the credit application, a new account is generated, a user is redirected back to the merchant system using the session ID, and the credit account information is securely transmitted back to the merchant. The state of the ongoing transaction is restored, and the new payment information is used to complete the transaction.

18 Claims, 6 Drawing Sheets

(56) References Cited

U.S. PATENT DOCUMENTS

| | | | |
|---|---|---|---|
| 6,185,543 B1 | 2/2001 | Galperin et al. | |
| 7,249,097 B2 | 7/2007 | Hutchison et al. | |
| 7,620,597 B2 | 11/2009 | Eze | |
| 7,680,728 B2 | 3/2010 | Lazerson | |
| 7,801,807 B2 | 9/2010 | DeFrancesco et al. | |
| 7,818,399 B1* | 10/2010 | Ross, Jr. | G06Q 30/0635 709/218 |
| 7,953,861 B2* | 5/2011 | Yardley | H04L 67/02 709/227 |
| 8,352,370 B1* | 1/2013 | White | G06Q 40/02 705/44 |
| 9,082,119 B2 | 7/2015 | Ortiz et al. | |
| 9,558,492 B2 | 1/2017 | Carrott | |
| 9,697,517 B1 | 7/2017 | Chambers et al. | |
| 9,779,405 B1 | 10/2017 | Krausz et al. | |
| 10,417,706 B1* | 9/2019 | Simon | G06Q 30/0643 |
| 2003/0101116 A1* | 5/2003 | Rosko | G06Q 20/10 705/35 |
| 2003/0191714 A1 | 10/2003 | Norris | |
| 2004/0030645 A1 | 2/2004 | Monaghan | |
| 2005/0077349 A1 | 4/2005 | Bonalle et al. | |
| 2005/0165684 A1 | 7/2005 | Jensen et al. | |
| 2006/0165060 A1 | 7/2006 | Dua | |
| 2007/0050289 A1 | 3/2007 | Zeller et al. | |
| 2008/0058014 A1 | 3/2008 | Khan et al. | |
| 2008/0126244 A1 | 5/2008 | Loving et al. | |
| 2009/0171839 A1 | 7/2009 | Rosano et al. | |
| 2009/0240947 A1 | 9/2009 | Goyal et al. | |
| 2009/0254440 A1 | 10/2009 | Pharris | |
| 2010/0138344 A1 | 6/2010 | Wong et al. | |
| 2011/0087595 A1 | 4/2011 | Sabella | |
| 2012/0215605 A1 | 8/2012 | Gardner et al. | |
| 2012/0215609 A1 | 8/2012 | Yoo et al. | |
| 2012/0290486 A1 | 11/2012 | Dobrowolski et al. | |
| 2012/0296824 A1 | 11/2012 | Rosano | |
| 2013/0124349 A1 | 5/2013 | Khan et al. | |
| 2013/0185192 A1 | 7/2013 | McGuire | |
| 2014/0070001 A1 | 3/2014 | Sanchez et al. | |
| 2014/0108263 A1 | 4/2014 | Ortiz et al. | |
| 2014/0279552 A1 | 9/2014 | Ortiz et al. | |
| 2015/0032627 A1 | 1/2015 | Dill et al. | |
| 2016/0048822 A1 | 2/2016 | Forrest | |
| 2016/0071094 A1 | 3/2016 | Krishnaiah et al. | |
| 2016/0117670 A1 | 4/2016 | Davis | |
| 2016/0217464 A1 | 7/2016 | Jajara et al. | |
| 2016/0269898 A1 | 9/2016 | Kuch | |
| 2016/0335688 A1 | 11/2016 | Wang et al. | |
| 2016/0350849 A1 | 12/2016 | Lynch | |
| 2016/0358250 A1 | 12/2016 | Dogin et al. | |
| 2016/0364795 A1 | 12/2016 | Bhaget et al. | |
| 2017/0017957 A1 | 1/2017 | Radu | |
| 2017/0017958 A1 | 1/2017 | Scott et al. | |
| 2017/0109736 A1 | 4/2017 | Heiman et al. | |
| 2017/0161735 A1 | 6/2017 | Ortiz et al. | |
| 2017/0228704 A1 | 8/2017 | Zhou et al. | |
| 2017/0270603 A1 | 9/2017 | Berta et al. | |
| 2017/0286768 A1 | 10/2017 | Livesay et al. | |
| 2018/0018660 A1 | 1/2018 | Gomes et al. | |
| 2018/0075527 A1 | 3/2018 | Nagla et al. | |
| 2018/0082284 A1 | 3/2018 | Gomes et al. | |
| 2018/0082303 A1 | 3/2018 | Chan-Bauza et al. | |
| 2018/0137508 A1 | 5/2018 | Shah et al. | |
| 2018/0174138 A1 | 6/2018 | Subbarayan et al. | |
| 2018/0183737 A1 | 6/2018 | Subbarayan et al. | |
| 2018/0276656 A1 | 9/2018 | Goyal et al. | |
| 2018/0330459 A1 | 11/2018 | Elder et al. | |
| 2019/0087809 A1 | 3/2019 | Bloy et al. | |
| 2019/0087894 A1 | 3/2019 | Bloy et al. | |
| 2019/0197231 A1 | 6/2019 | Meier | |
| 2019/0251542 A1 | 8/2019 | Sjoberg et al. | |
| 2019/0273607 A1 | 9/2019 | Van Der Velden et al. | |
| 2019/0310837 A1 | 10/2019 | Zmijewski et al. | |
| 2020/0007336 A1 | 1/2020 | Wengel | |
| 2020/0118205 A1 | 4/2020 | Bloy et al. | |
| 2020/0265435 A1 | 8/2020 | Bankston et al. | |
| 2020/0302081 A1 | 9/2020 | Faitelson et al. | |
| 2020/0327529 A1* | 10/2020 | Mukherjee | G06Q 40/025 |
| 2021/0279795 A1 | 9/2021 | Bloy et al. | |

OTHER PUBLICATIONS

Envestnet [online] Yodlee Risk Insight for Pre-Qualification Mar. 19, 2019 retrieved from URL <https://resources.yodlee.com/risk-insights/envestnet-yodlee-risk-insight-for-pre-qualification>, 2 pages.

Urrico "Emphasizing Account Opening, Cybersecurity & Consumer Experience" Date of Publication: Jul. 31, 2018; retrieved from URL <https://www.cutimes.com/2018/07/31/emphasizing-account-opening-cybersecurity-consumer/?slreturn=20180929060828>, 2 pages.

Mnuchin, et al., "A Financial System That Creates Economic Opportunities Nonbank Financials, Fintech, and Innovation" Date of Publication: Jul. 18, 2018. retrieved from URL <https://home.treasury.gov/sites/default/files/2018-08/A-Financial-System-that-Creates-Economic-Opportunities---Nonbank-Financials-Fintech-and-Innovation_0.pdf>, 222 pages.

U.S. Appl. No. 16/416,698, Bloy et al., Integration of Workflow with Digital ID, filed May 20, 2019, 43 of pages.

Afteracademy.com [online], "What is a TCP 3-Way Handshake Process?" Feb. 2020, [retrieved on Jun. 29, 2021], retrieved from: URL <https://afteracademy.com/blog/what-is-a-tcp-3-way-handshake-process>, 9 pages.

Otjacques et al., "Interoperability of e-government information systems: Issues of identification and data sharing." Journal of management information systems 23.4, May 2007, 24 pages.

Sirbu et al., "Credits and debits on the Internet." IEEE spectrum 34.2, Feb. 1997, 7 pages.

Techopeida.com [online], "Three-Way Handshake" Nov. 2020, [retrieved on Jun. 29, 2021], retrieved from : URL <https://www.techopedia.com/definition/10339/three-way-handshake>, 5 pages.

* cited by examiner

INTEGRATED CREDIT APPLICATION AND MERCHANT TRANSACTION INCLUDING CONCURRENT VISUALIZATION OF TRANSACTION DETAILS

TECHNICAL FIELD

The present disclosure involves systems, software, and computer-implemented methods for integrating immediate credit application processes and decisions via a financial institution into ongoing transactions performed at a merchant system, including by providing a visualization of the merchant transaction while applying at the financial institution's systems. In doing so, transactions are allowed to be completed using new lines of credit that are opened in real-time during the merchant transaction process while remaining within the experience of the transaction visually, and by maintaining a particular transaction session even after being redirected from the merchant system to the financial system and back again.

BACKGROUND

Online and e-commerce transactions are ubiquitous in today's society. Many merchants, including those with brick and mortar locations, have found more and more of their sales to be delivered via online or connected channels. Using merchants' online platforms, customers may use their existing payment methods to complete transactions.

New credit applications typically result in a period of time during which an initial transaction may be available or allowable in response to a credit application acceptance and usage. However, the generated card may only be available for the single usage, and may not be available for future transactions. Further, any credit account may result in contingent liability on the part of the providing merchant.

SUMMARY

The present disclosure involves systems, software, and computer-implemented methods for integrating immediate credit application processes and decisions via a financial institution into ongoing transactions performed at a merchant system, including by providing a visualization of the merchant transaction while applying at the financial institution's systems. In doing so, transactions are allowed to be completed using new lines of credit that are opened in real-time during the merchant transaction process while remaining within the experience of the transaction visually, and by maintaining a particular transaction session even after being redirected from the merchant system to the financial system and back again.

A first example system includes a communications module, at least one memory storing instructions and a repository storing a set of credit accounts, where each credit account associated with a user. At least one hardware processor interoperably coupled with the at least one memory and the communications module, wherein the instructions instruct the at least one hardware processor to perform operations. Those operations can include receiving, via the communications module, a first signal including a request to initiate an application for a new credit account for a first user, where the request is associated with an ongoing transaction at a second system and includes a payload including a session identifier (ID) of the ongoing transaction and a set of transaction information identifying at least one item associated with the ongoing transaction. A digital credit application associated with the received request can be presented via a user interface, wherein presenting the digital credit application includes concurrently presenting at least a subset of the set of transaction information identifying the at least one item associated with the ongoing transaction. In response to completion of the digital credit application, a credit adjudication process can be performed based on a set of application data associated with the first user. In response to an approval during the credit adjudication process, a new credit account associated with the first user can be created, where the new credit account is associated with a set of payment information. Using the communications module and through a first communication channel, a second signal including an instruction to redirect the first user can be transmitted to the second system, the second signal including the session ID of the ongoing transaction at the second system. Further, in response to the new credit account associated with the first user being created, and using the communications module and through a second communications channel, a third signal including a set of payment information associated with the new credit account can be transmitted to the second system, wherein the first communications channel and the second communications channel are different.

Implementations can optionally include one or more of the following features.

In some instances, the second system includes a merchant system, wherein the ongoing transaction at the merchant system comprises a purchase being performed by the first user. In some of those instances, the first signal is transmitted in response to the first user indicating a request for a new credit account to be used to complete the purchase being performed by the first user. In those instances, the third signal includes information associated with the first user, wherein the set of payment information associated with the new credit account is associated with a customer account of the first user at the merchant system. In some of those instances, after the set of payment information is associated with the customer account of the first user at the merchant system, the set of payment information is tokenized. In some instances, the second signal and the third signal are transmitted concurrently, such that the set of payment information is associated with the customer account of the first user at the merchant system concurrently with the redirection of the first user to the second system.

In some instances, the second communications channel comprises a secure communication channel to the merchant system.

In some instances, the instructions instruct the at least one hardware processor to, in response to the new credit account associated with the first user being created, transmit, via the communications module and through a third communications channel to a user device associated with the first user, a fourth signal including a set of terms and conditions associated with the new credit account.

In some instances, the first signal is received from a client application at a user device associated with the first user executing an e-Commerce application associated with the second system.

In some instances, the session ID is associated with a particular state of the ongoing transaction at the second system, and wherein after executing the instruction to redirect the first user to the second system, the second system restores the particular state associated with the session ID.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
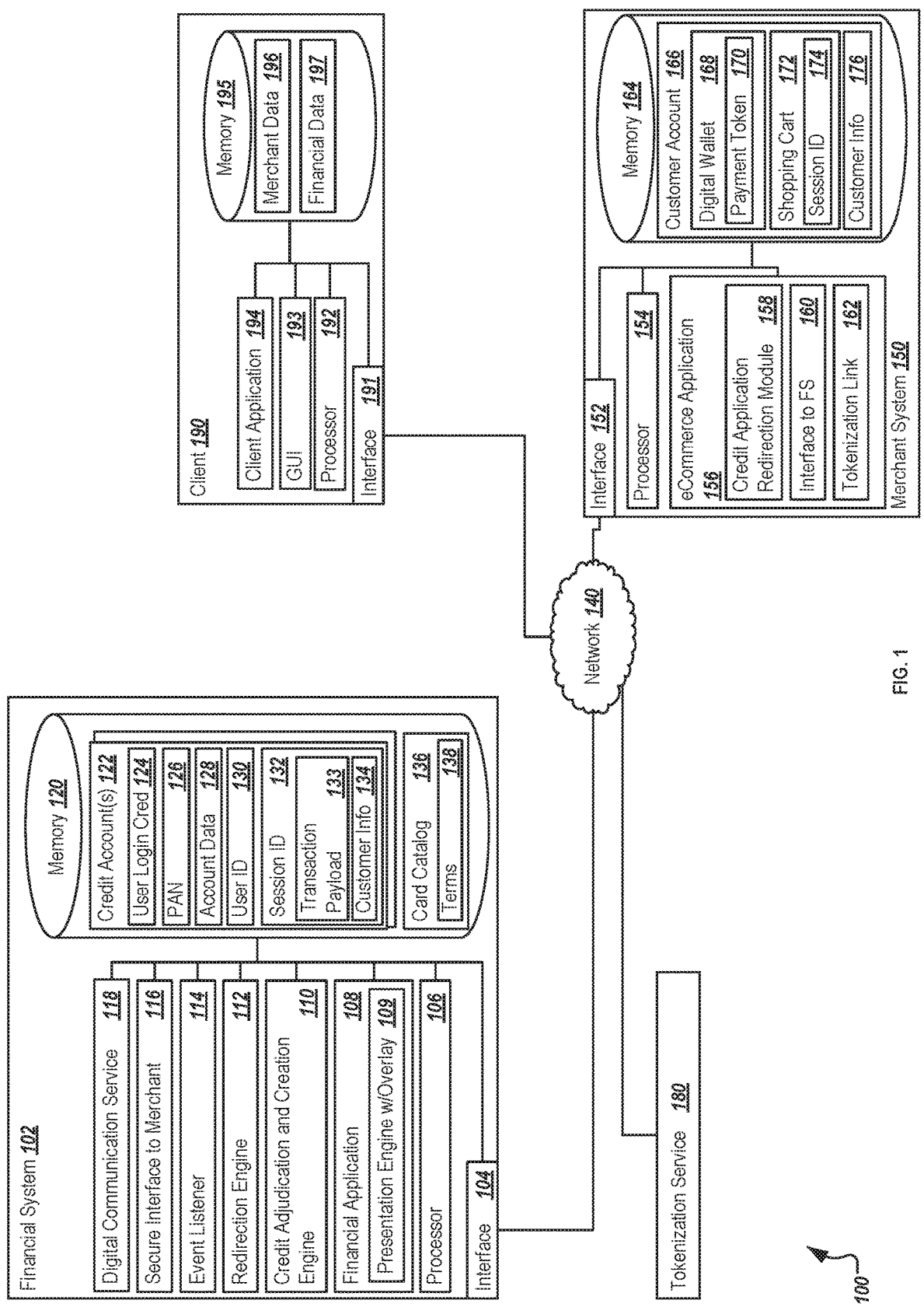
FIG. 1 is a block diagram illustrating an example system for integrating immediate credit application processes and decisions via a financial institution into ongoing transactions performed at a merchant system.

The present disclosure describes various tools and techniques associated with integrating immediate credit application processes and decisions via a financial institution into ongoing transactions performed at a merchant system. Specifically, the described solution allows merchant systems and financial systems to provide a relatively seamless interaction in completing transactions, where the transactions initiate at a merchant system and are then transferred mid-transaction to the financial system in order to open a new credit account. Using a session identifier (ID) to associate the transaction at the merchant system and the application at the financial system, as well as a transaction payload that allows the shopping cart and transaction information to be presented during the financial credit application process, customers are able to visualize the basis for their credit application as shared by the merchant system. Once the credit application is accepted and the new credit line opened, the financial system can redirect the customer back to the original session at the merchant system using the session ID, while concurrently or in near-real-time securely providing, via a different communication channel, the new payment information to be incorporated into the merchant system and made available for the current transaction.

As noted, the present solution provides several significant benefits and advantages due to the architecture and processes in which the operations occur. First, the visualization and shared information from the merchant system to the financial system provides a coherent and continuing experience during a redirection from the shopping transaction to the credit application. In doing so, navigation is facilitated and the shared session information can be linked between the systems. Further, upon completing the application and being approved for the new credit, a pair of actions by the financial system can allow the immediate and real-time, or near real-time, integration of the new payment option to the merchant's shopping or transaction session. A first action allows a re-routing operation to occur, where the customer is taken directly back to the state of the merchant system they were in just prior to redirecting to the financial system using the session ID. Concurrently, simultaneously, and/or within a close time period of the redirection back, the financial system can securely provide the newly generated payment information to the merchant system to be added to the customer's account. In some instances, the merchant system can immediately have that payment information tokenized using an available tokenization service such that a tokenized set of payment credentials corresponding to the newly opened credit account can be immediately available and linked to the customer account at the merchant upon returning to the transaction. In some cases, the present solution can be incorporated into existing payment options, such as holds available on some airline websites. An entire flight itinerary can be booked, and the associated ticket(s) can be held at the time of completion. Those ticket(s) can be held so that the seats are maintained for the customer while the credit application is processed, and while the information is shared with the financial system. In some instances, the information may be associated with a timer or other limited amount of time in which the transaction will be paused and the session ID stored. Once the credit application is submitted and accepted, the session ID can be used to identify the merchant transaction to be completed and the payment information can be used upon the return to the merchant site or experience.

Turning to the illustrated example implementation, FIG. 1 is a block diagram illustrating an example system 100 for integrating immediate credit application processes and decisions via a financial institution into ongoing transactions performed at a merchant system. Specifically, the illustrated implementation is directed to a solution where a customer can initially interact with a merchant system 150 (e.g., via their e-Commerce application 156) to identify one or more items or services to include in a transaction. During that interaction, a link or option to apply for credit from an associated financial system 102 may be provided and selected by the customer. Prior to redirecting the customer to the financial system 102 and a related financial application 108, information about the current transaction can be stored, and can be associated with (or will already be associated with) a session identifier (ID) to uniquely reference the transaction. The session ID, along with a set of information about the transaction, and, in some cases, information about the customer, can be transmitted to the financial system 102 and the financial application 108, where the customer can apply for a new credit account to be used at the merchant system 150 to complete the current transaction. The set of information about the transaction, which can include one or more items or services being purchased at the merchant system 150 (e.g., a travel itinerary, one or more electronics, a set of home appliances, etc.), can be presented by the financial application 108 in combination with an application for credit. Further, the customer information can be used to link a customer account 166 at the merchant system 150 with a new credit account 122 at the financial system 102, or with one or more existing credit accounts 122 with which the customer is already associated. Once the customer inputs the relevant credit application information, the financial system 102 and its credit adjudication and creation engine 110 can perform the necessary identity confirmation and creditworthiness analyses. If the credit application is accepted, the credit adjudication and creation engine 110 can create a new credit account 122 for the customer, and can redirect the customer back to the merchant system 150 for finalizing the transaction by providing the session ID 174 associated with a particular shopping cart 172 and customer. In parallel with the redirection, the new account can be identified and information associated therewith can be securely transmitted back to the merchant system 150, where the merchant system 150 can store the payment information in the corresponding customer account 166 and digital wallet 168. The merchant system 150 can, in some instances, provide the payment details to a tokenization service 180 to generate a payment token corresponding to the new credit account information received from the financial system 102, and the payment token 170 can be stored and used, in realtime or near-realtime to finalize the transaction.

In general, system 100 allows the illustrated components to share and communicate information across devices and systems (e.g., merchant system 150, financial system 102, client 190, and tokenization service 180, among others, via network 140). As described herein, any of the systems, including the financial system 102 and/or merchant system 150 may be cloud-based components or systems (e.g., partially or fully), while in other instances, non-cloud-based systems may be used. In some instances, non-cloud-based systems, such as on-premise systems, client-server applications, and applications running on one or more client devices, as well as combinations thereof, may use or adapt the processes described herein. Although components are shown individually, in some implementations, functionality of two or more components, systems, or servers may be provided by a single component, system, or server.

As used in the present disclosure, the term "computer" is intended to encompass any suitable processing device. For example, financial system 102, merchant system 150, and client 190 may be or may be associated with any computer or processing devices such as, for example, a blade server, general-purpose personal computer (PC), Mac®, workstation, UNIX-based workstation, or any other suitable device. Moreover, although FIG. 1 illustrates a single financial system 102, system 100 can be implemented using a single system or more than those illustrated, as well as computers other than servers, including a server pool. Other illustrated components may be similarly separated, where suitable. In other words, the present disclosure contemplates computers other than general-purpose computers, as well as computers without conventional operating systems. Similarly, the client 190 may be any system that can request data and/or interact with the merchant system 150 and the financial system 102, including a system used to initiate a particular transaction that leads to using the solution described herein. The client 190, also referred to as client device 190, in some instances, may be a desktop system, a client terminal, or any other suitable device, including a mobile device, such as a smartphone, tablet, smartwatch, or any other mobile computing device. In general, each illustrated component may be adapted to execute any suitable operating system, including Linux, UNIX, Windows, Mac OS®, Java™, Android™, Windows Phone OS, or iOS™, among others. The client 190 may include one or more financial institution-specific applications executing on the client 190, or the client 190 may include one or more Web browsers or web applications that can interact with particular applications (e.g., the e-Commerce application 156 and/or the financial application 108) executing remotely from the client 190.

The financial system 102 provides a backend system associated with a financial institution used to manage one or more accounts and financial services, including the issuance of credit. In the illustrated instance, the financial system 102 represents a financial institution capable of receiving applications for new credit accounts, where the applications for credit can be immediately evaluated and, if approved, a corresponding new credit account 122 can be generated. In this solution, the financial system 102 can receive information from the merchant system 150 that relates to a particular session ID 132, and a transaction payload 133. The transaction payload 133 can include, for example, particular items and services in a shopping cart 172 at the merchant system 150, as well as prices and/or other relevant product information, including travel information, product details, quantity, etc. related to the products. Information from the transaction payload 133 can be presented during interactions with the financial application 108 being used to apply for credit, where the information related to the transaction payload 133 can provide customers with a clear view of the particular goods and/or services for which they are applying. A presentation engine 109 associated with the financial application 108 can be used to manage the presentation of the transaction payload 133 information, and can be presented as an overlay on the credit application, a portion of a user interface (UI) associated with the credit application (e.g., a top, side, or bottom pane or portion of the UI). In some instances, a new window may be generated for the customer, as well as any other suitable presentation of the information. Once the new credit account 122 is opened, a redirection engine 112 can be used to redirect the customer back to the merchant system's e-Commerce application 156, where the session ID 132 received at the financial system 102 is then returned and provided to the merchant system 150.

In parallel, concurrently (fully or partially), or right after or before the redirection, an event listener 114 can monitor a plurality of credit accounts 122 for newly created accounts, such as the account associated with the current instance. In response to the new account, the new account information can be securely transmitted to the merchant system 150 (e.g., via a secure interface to merchant 116), where the information can be used to add the new payment information to the customer account 166 associated with the session ID 132, 174. Additionally, the event listener 114 can initiate a digital communication service 118, where terms and conditions 138 associated with the new credit account 122 can be identified and transmitted to the client 190 associated with the customer to fulfill any legal and regulatory requirements related to new credit disclosures.

As illustrated, the financial system 102 includes or is associated with interface 104, processor(s) 106, financial application 108, credit adjudication and creation engine 110, redirection engine 112, event listener 114, secure interface to merchant 116, the digital communication service 118, and memory 120. While illustrated as provided by or included in the financial system 102, parts of the illustrated contents may be separate or remote from the financial system 102, or the financial system 102 may be distributed.

The interface 104 of the financial system 102 is used by the financial system 102 for communicating with other systems in a distributed environment—including within the environment 100—connected to the network 140, e.g., client 190, merchant system 150, as well as other systems communicably coupled to the illustrated financial system 102 and/or network 140. Generally, the interface 104 comprises logic encoded in software and/or hardware in a suitable combination and operable to communicate with the network 140 and other components. More specifically, the interface 104 may comprise software supporting one or more communication protocols associated with communications such that the network 140 and/or interface's hardware is operable to communicate physical signals within and outside of the illustrated environment 100. Still further, the interface 104 may allow the financial system 102 to communicate with the client 190 and/or other portions illustrated within the financial system 102 to perform the operations described herein.

Network 140 facilitates wireless or wireline communications between the components of the environment 100 (e.g., between the financial system 102, merchant system 150, the client(s) 190, tokenization service 180, etc.), as well as with any other local or remote computers, such as additional mobile devices, clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the merchant system 150, the financial system 102, etc.) may be included within or deployed to network 140 or a portion thereof as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n/ac, 802.20, WiMax, LTE, 5G, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

The financial system 102, as illustrated, includes one or more processors 106. Although illustrated as a single processor 106 in FIG. 1, multiple processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the financial system 102. Specifically, the processor 106 executes the algorithms and operations described in the illustrated figures, as well as the various software modules and functionality, including the functionality for sending communications to and receiving transmissions from the merchant system 150 and/or the client 190, as well as to other devices and systems. Each processor 106 may have a single or multiple core, with each core available to host and execute an individual processing thread. Further, the number of, types of, and particular processors 106 used to execute the operations described herein may be dynamically determined based on a number of requests, interactions, and operations associated with the financial system 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The financial application 108 may be a web page, web-based application, application programming interface (API), or other software provided by or associated with the financial system 102, and can represent or include an interactive website, form, or other interactive component at which information associated with a credit application can be submitted. The financial application 108 may be a front-end used to receive input for the credit application, and can provide the received information to one or more backend systems, such as the credit adjudication and creation engine 110. In some instances, the financial application 108 may be dedicated to receiving credit applications, while in others, the financial application 108 may provide additional functionality, including account review, financial investment and money transfer functionality, and other available operations and actions. For purposes of the present disclosure, the financial application 108 can interact with customers directly, via client application 194, or via any other suitable application, such as a browser or dedicated application.

Figure 5A:
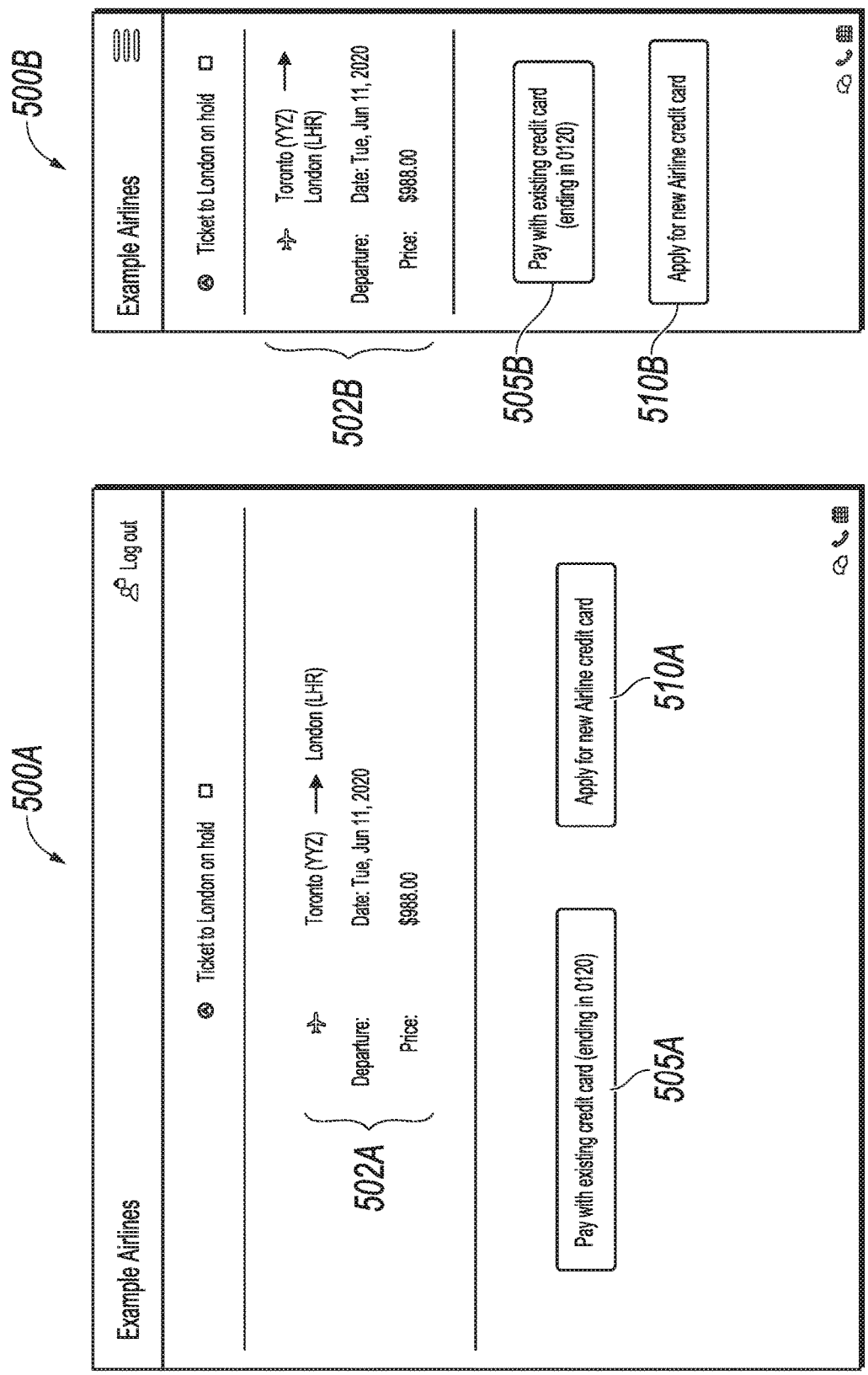
FIGS. 5A and 5B illustrate example screenshots associated with the described solution.
Figure 5B:
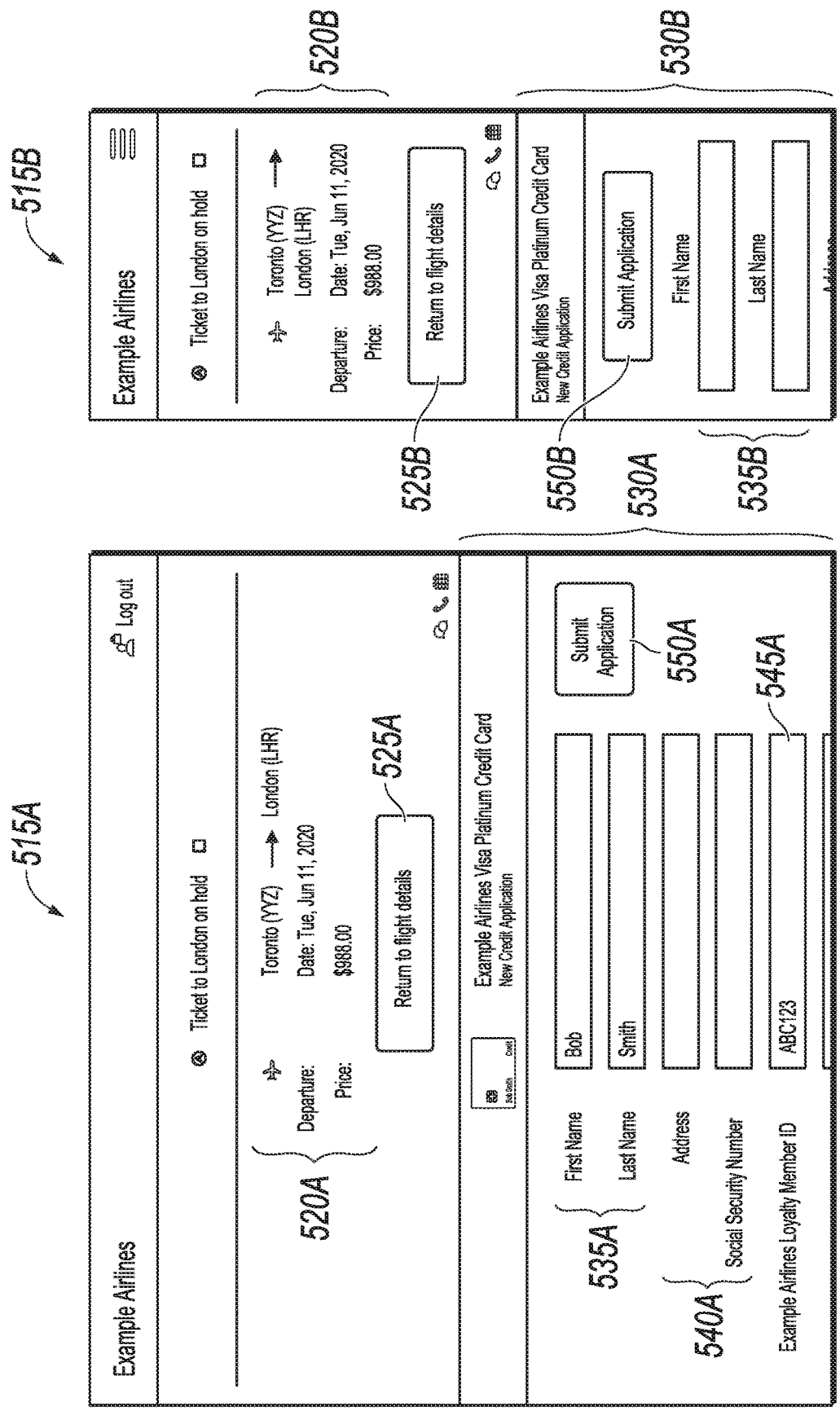

As described, the financial application 108 can be accessed after a redirection from a transaction being performed at the merchant system 150, where the accessing operations to initiate a credit application include a signal or series of signals including a session ID 132, a transaction payload 133, and, optionally, a set of customer information 134. The set of customer information 134 may be information associated with a particular customer account 166 at the merchant system 150, which may include personal identifying information (PII) already collected by the merchant system 150 and that can be used to pre-populate at least some of the information in an interactive application for credit. Additionally, information associated with a particular loyalty account with the merchant system 150 may be included. During the completion of the application, the presentation engine 109 of the financial application 108 can be used to present at least a portion of the transaction payload 133 on, near, or around the application fields of entry used to complete the required information. FIGS. 5A and 5B illustrate example presentations in mobile devices of varying sizes. In some instances, the application for credit can be dynamically modified in presentation by the presentation engine 109 to match or be similar to the look and/or feel of the merchant system's e-Commerce application 156. In doing so, along with the shared transaction payload 133 information, the look of the application can provide an additional feel that the customer has not been redirected to an external site or application from the e-Commerce application 156.

Once information associated with the application for credit is completed and submitted, the credit adjudication and creation engine 110 of the financial system 102 is used to perform a creditworthiness analysis based on one or more credit rules defined by the financial institution, which can be used to determine whether the credit application is to be accepted or rejected, as well as an amount associated with the acceptance, where appropriate. The credit adjudication and creation engine 110 can access one or more databases and credit bureaus when making its determination, and, in some cases, can provide an instantaneous or near-instantaneous decision regarding the credit application. In response to approving the credit application, the credit adjudication and creation engine 110 can create a new credit account 122 for the customer as approved during the adjudication process. The credit adjudication and creation engine 110 may act as a master account management system, and can perform credit provisioning and management within the financial system 102. In some instances, the credit adjudication and creation engine 110, or a portion thereof, may be a credit management system offered by TSYS or another vendor. The credit adjudication and creation engine 110 generates the new credit account 122, as well as some or all of the information associated with the customer received from the credit application, which can be stored in the account data 128. In some instances, a personal account number (PAN) 126 may be generated for the credit account 122, which may be identical to the account number of the new credit account 122, or may be an alternative identifier to be used in transactions. In many instances, the result of the credit generation process is the creation of a new, unique account number that can be used to perform one or more transactions on the new credit account. In addition, a set of user login credentials 124 can be generated that are associated with the new account 122, and can be used for later access to the account 122. Initially, information including the session ID 132 (also 174) and the transaction payload 133 and any customer information 134 may be stored in association with a credit account 122. Alternatively, such information may be stored elsewhere, maintained temporarily, or stored in another location. In some instances, after completion of the credit account generation, at least a part of the information may be deleted or otherwise included in or added to the set of account data 128. In some instances, a particular personal account number (PAN) 126 can be associated with the credit account 122, which may be identical to the account number of the new credit account 122, or may be an alternative identifier to be used in transactions. In many instances, the result of the credit generation process is the creation of a new, unique account number that can be used to perform one or more transactions on the new credit account 122. The PAN 126 may match a number of a credit card or other payment instrument that may be generated at a later time, or may be a unique number that can be used to generate a unique payment token to be used at the merchant system 150. A user ID 130 may be associated with the credit account 122, which may be similar to or different from the user login credentials 124 and/or the PAN 126, which may be used internally to the financial system 102 or to connect a particular credit account 122 to a particular customer account 166 at the merchant system 150. The user ID 130 may be a set of loyalty account information associated with the merchant 150 in some instances, which can be used to identify the customer at each system.

Redirection engine 112 may be included in or a part of the financial application 108, or may be separate from the financial application 108. The redirection engine 112 can be used, upon an indication that the credit adjudication and account opening processes have completed, to redirect the customer to the e-Commerce application 156. The redirection engine 112 can identify and share the result of the application, either that the application was accepted or denied, and can include the particular session ID 132 associated with the customer's transaction in the redirection instructions. In some instances, the redirection instruction can be issued or transmitted automatically upon approval. In other instances, the presentation engine 109 may present a button, link, or other interactive element that, when activated, causes the redirection managed by the redirection engine 112 to occur. In some instances, additional information may be included in the redirection instructions, including additional customer information that may be relevant to the new redirection.

Event listener 114 may be any program, agent, application, daemon, or other suitable component that performs monitoring of the plurality of credit accounts 122 managed by or associated with the financial system 102 to determine when a new account is generated. When a new account is generated, and when that account is associated with a particular session ID 132 and/or a corresponding customer account 166 at a merchant system 150, the event listener 114 can initiate an interaction to securely provide the merchant system 150 with payment data and information associated with the new credit account 122. The secure transmission can be performed via a secure interface to the merchant 116, which may be a particular API, agent, program, or other interface or channel which can provide the information in a secure manner. In some instances, the secure interface 116 may include a connection to an API of the merchant system 150, where the payment information is transmitted and associated with a particular customer account 166.

The event listener 114 can also notify a digital communication service 118 of the new credit account 122, where the digital communication service 118 can cause a set of terms and conditions 138 associated with the new credit account 122 to be transmitted to the client 190 to meet or exceed any legal and/or regulatory notification requirements. The digital communication service 118 can cause the notifications to be provided to any suitable endpoint via any suitable channel, including email, text messages, secure in-app messaging, phone-based disclosures, or any other channel.

Memory 120 of the financial system 102 may represent a single memory or multiple memories. The memory 120 may include any memory or database module and may take the form of volatile or non-volatile memory including, without limitation, magnetic media, optical media, random access memory (RAM), read-only memory (ROM), removable media, or any other suitable local or remote memory component. The memory 120 may store various objects or data, including financial data, user and/or account information, administrative settings, password information, caches, applications, backup data, repositories storing business and/or dynamic information, and any other appropriate information associated with the financial system 102, including any parameters, variables, algorithms, instructions, rules, constraints, or references thereto. Additionally, the memory 120 may store any other appropriate data, such as VPN applications, firmware logs and policies, firewall policies, a security or access log, print or other reporting files, as well as others. While illustrated within the financial system 102, memory 120 or any portion thereof, including some or all of the particular illustrated components, may be located remote from the financial system 102 in some instances, including as a cloud application or repository, or as a separate cloud application or repository when the financial system 102 itself is a cloud-based system. As illustrated and previously described, memory 120 includes a plurality of credit accounts 122 associated with particular customers, as well as a card catalog 136 identifying a set of credit card options provided by the financial system 102. Additional and/or alternative information may be stored in or associated with memory 120. In some instances, the credit accounts 122 may be stored in an account book of record maintained by a third-party, where information defining particular accounts 122 is stored remote from the financial system 102, such as in a TSYS-managed system. The financial system 102 can access and update the information using any suitable connection, and can use the third-party system to manage the created accounts.

While not illustrated herein, once a new credit account is generated, the financial system 102 may optionally trigger a physical card generation process, where a physical card is generated and can be physically delivered to the user. Any suitable process for card generation can be used, and can allow the user to use the new credit account offline and at locations other than those associated with the merchant system 150, or brick-and-mortar locations of the merchant system 150. In some instances, no physical card may be generated after the new credit account 122 is generated.

Merchant system 150, as described, represents a system associated with a merchant offering goods and/or services, and may be any computing system providing those capabilities. In some instances, the merchant system 150 may be associated with both an online and brick-and-mortar business, where the merchant system 150 described in FIG. 1 is associated with the e-Commerce or online portion of the business. The merchant system 150 may, in some cases, be associated with an online or e-Commerce-only business or enterprise. In any event, customers may be able to access the goods and/or services of the merchant system 150 via the e-Commerce application 156, which may be associated with a dedicated application used at the client 190, or may be a web site or web-based application that allows customers to perform e-Commerce activities through their web browsers or associated general applications. Customers can, during their shopping interactions, request new credit lines to pay for the items in their current transaction. In doing so, a real-time or near-real-time credit application process is performed, and upon completion, the customer is placed into the same shopping state but with the option to complete the transaction with the newly added credit line or payment instrument. In some instances, the merchant systems 150 can be associated with particular merchants providing co-branded or loyalty-based credit cards in association with a financial institution associated with the financial system 102, which may be the particular card and credit account being applied for in the present solution. In other instances, a non-partner or loyalty-based card may be applied for using the described system.

As illustrated, merchant system 150 includes interface 152 (similar to or different from interface 014), processor(s) 154 (similar to or different from processor(s) 106), e-Commerce application 156, and memory 164 (similar to or different from memory 120). Interface 152 allows the merchant system 150 to communicate with network 140 and any other communicably coupled systems, including financial system 102, client 190, and tokenization service 180. Processor 154, which may include one or more processors similar to processor 106, can be used to execute the operations of the merchant system 150, including those related to the e-Commerce application 156. The illustrated merchant system 150 is intended to encompass any computing device such as a desktop computer, laptop/notebook computer, cloud computing system, tablet computing device, server, workstation, one or more processors within these devices, or any other suitable processing device. In general, the merchant system 150 and its components may be adapted to execute any operating system, including Linux, UNIX, Windows, Mac OS®, Java™, Android™ or iOS. In some instances, the merchant system 150 may comprise a computer that includes an input device, such as a keypad, touch screen, or other device(s) that can interact with one or more e-Commerce applications 156, as well as point-of-sale applications, where appropriate. In some instances, the e-Commerce application 156 may represent a web page, web site, or web application, including one accessed using a dedicated mobile application, where customers can add items from a catalog or interactive website to a shopping cart 172, and can allow those customers to complete the transaction using one or more credit cards, including cards applied for and issued during the transaction itself as described herein.

In particular instances, customers can, during their interaction with the e-Commerce application 156, trigger a process for applying for credit at the financial system 102. The e-Commerce application 156, as illustrated, includes a credit application redirection module 158 to manage the interactions associated with the current transaction and the application for credit. The credit application redirection module 158 can provide functionality related to the sharing of data to the financial system 102 in response to a request to apply for credit. The credit application redirection module 158 can obtain a current session ID 174 associated with a shopping cart 172 corresponding to the current transaction. The contents of the shopping cart 172 can also be obtained, with the credit application redirection module 158 including that information in the instructions to redirect the customer's experience and interactions to the financial application 108. In some instances, a button or other interactive UI element may be provided by or associated with the module 158 to trigger the redirection. When or prior to the redirecting, the session ID 174 is associated with a stored set of information regarding the shopping cart 172 and any associated preferences or state of the current transaction. By referencing the session ID 174, the financial system 102's redirection back can be directly associated with the prior state of the transaction once the credit account 122 is created and available. The credit application redirection module 158 can also provide customer information 176 to the financial system 102 prior to the initial redirection. That information 176 can include personal information about the customer, including a loyalty membership identifier or number, allowing later connections between the credit account 122 and the customer account 166. Additionally, at least some of the information 176 can include information used to complete or pre-fill at least a portion of the credit application in the financial application 108. In some instances, communications associated with the redirection back from the financial system 102 can be directed to or can be acted upon by the credit application redirection module 158 in placing the e-Commerce application 156 into the correct prior state.

The interface to the financial system 160 can provide functionality to both send information to and receive information from the financial system 160. In some instances, the interface to the financial system 160 may be a secure interface or endpoint that allows secure transfer of sensitive data, including payment information associated with the new credit account 122. In some instances, two or more interfaces may be available for communication for different purposes. In particular, the interface to the financial system 160 can receive communications including the new payment information from the secure interface to the merchant 116. Once received, the payment information can be provided to the tokenization link 162, which can request tokenization of the payment information by the tokenization service 180. In doing so, the payment information can be tokenized and associated with a digital wallet 168 managed under the customer account 166, and the corresponding payment token 170 can be available to be used immediately. In many cases, the tokenization process can be performed concurrently with the redirection process back from the financial system 102 and the placing of the e-Commerce application 156 back into the state associated with the received session ID, such that the new payment method is available once the state is restored.

As illustrated, memory 164 includes one or more customer accounts 166, where particular customer accounts 166 can, in some instances, be associated a digital wallet 168 storing one or more payment tokens 170 corresponding to particular credit accounts 122. In some instances, non-tokenized payment information may also be stored in or associated with the customer accounts 166.

As illustrated, one or more clients 190 may be present in the example system 100. Each client 190 may be associated with a particular customer, or may be accessed by multiple customers, where a particular customer, when interacting with the e-Commerce application 156, is associated with a unique current session associated with a unique session ID 174. Client 190 may be a client device at which a particular customer is linked or associated, or a client device through which the particular customer, using client application 194, can interact with the financial system 102. As illustrated, the client 190 may include an interface 191 for communication (similar to or different from interfaces 104 and 152), at least one processor 192 (similar to or different from processors 106 and 154), a graphical user interface (GUI) 193, client application 194, and memory 195 (similar to or different from memories 120 and 164).

The illustrated client 190 is intended to encompass any computing device such as a desktop computer, laptop/notebook computer, mobile device, smartphone, personal data assistant (PDA), tablet computing device, one or more processors within these devices, or any other suitable processing device. In general, the client 190 and its components may be adapted to execute any operating system, including Linux, UNIX, Windows, Mac OS®, Java™, Android™, or iOS. In some instances, the client 190 may comprise a computer that includes an input device, such as a keypad, touch screen, or other device(s) that can interact with one or more client applications, such as one or more mobile applications, including a web browser, mobile wallet or other banking application, and an output device that conveys information associated with the operation of the applications and their application windows to the user of the client 190. Such information may include digital data, visual information, or a GUI 193, as shown with respect to the client 190. Specifically, the client 190 may be any computing device operable to communicate with the financial system 102, other clients 190, one or more merchant systems 150, and/or other components via network 140, as well as with the network 140 itself, using a wireline or wireless connection. In general, client 190 comprises an electronic computer device operable to receive, transmit, process, and store any appropriate data associated with the environment 100 of FIG. 1.

The client application 194 executing on the client 190 may include any suitable application, program, mobile app, or other component. Client application 194 can interact with the financial system 102, one or more merchant systems 150 (e.g., to browse and/or purchase goods and services, etc.), or other systems, via network 140. In some instances, the client application 194 may be a web browser, where the functionality of the client application 194 may be realized using a web application or website the user can interact with via the client application 194. In other instances, the client application 194 may be a remote agent, component, or client-side version of the financial system 102, or a dedicated application associated with the financial system 102 and/or the merchant system 150. In some instances, the client application 194 may interact directly with the financial system 102 or portions thereof. The client application 194 may be used to view or interact with the financial system 102 and/or the merchant system 150, and can allow or provide interactions for performing transactions with the merchant system 150 and related credit application submissions via the financial system 102, as described herein.

GUI 193 of the client 190 interfaces with at least a portion of the environment 100 for any suitable purpose, including generating a visual representation of any particular client application 194, and/or the content associated with any components of the financial system 102 and/or merchant system 150. In particular, the GUI 193 may be used to present screens and information associated with selecting and adding items to shopping cart 172 using the e-Commerce application 156, as well as submitting the credit application via the financial application 108, among others. GUI 193 may also be used to view and interact with various web pages, applications, and web services located local or external to the client 190. Generally, the GUI 193 provides the user with an efficient and user-friendly presentation of data provided by or communicated within the system. The GUI 193 may comprise a plurality of customizable frames or views having interactive fields, pull-down lists, and buttons operated by the user. In general, the GUI 193 is often configurable, supports a combination of tables and graphs (bar, line, pie, status dials, etc.), and is able to build real-time portals, application windows, and presentations. Therefore, the GUI 193 contemplates any suitable graphical user interface, such as a combination of a generic web browser, a web-enable application, intelligent engine, and command line interface (CLI) that processes information in the platform and efficiently presents the results to the user visually.

As illustrated, memory 195 may include a set of merchant data 196 and/or a set of financial data 197. The merchant data 196 and the financial data 197 may include information for logging into the customer account 166 or the credit account 122, respectively. Additionally, the data 196 and 197 may store information related to a particular transaction or account for a period of time, including information used by the client application 194 to complete particular transactions. In some instances, in addition to the payment token 170 being added to the digital wallet 168, a mobile wallet can be maintained by the client 190, and a corresponding token may be added to the mobile wallet at the client 190.

The tokenization service 180, described above, may be associated with any suitable or associated payment network associated with the new credit account 122. For example, if the new credit account 122 is associated with a new Visa card, then the payment network token service 180 may be a Visa-associated service capable of generating payment tokens and credentials related to or associated with the credit account 122. Other payment networks may also be used, while third-party services authorized by the payment networks and financial systems 102 may also be used instead. The tokens created by the service 180 can link the tokens to actual accounts 122 without specifically identifying the PAN 126 or account number of the credit account 122, allowing more secure transactions to be performed. Once the digital version of the credit card (i.e., the payment token 170) is provisioned to the digital wallet 168, transactions can be performed with the corresponding merchant system 150, including to complete the current transaction associated with the session ID 174.

While portions of the elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
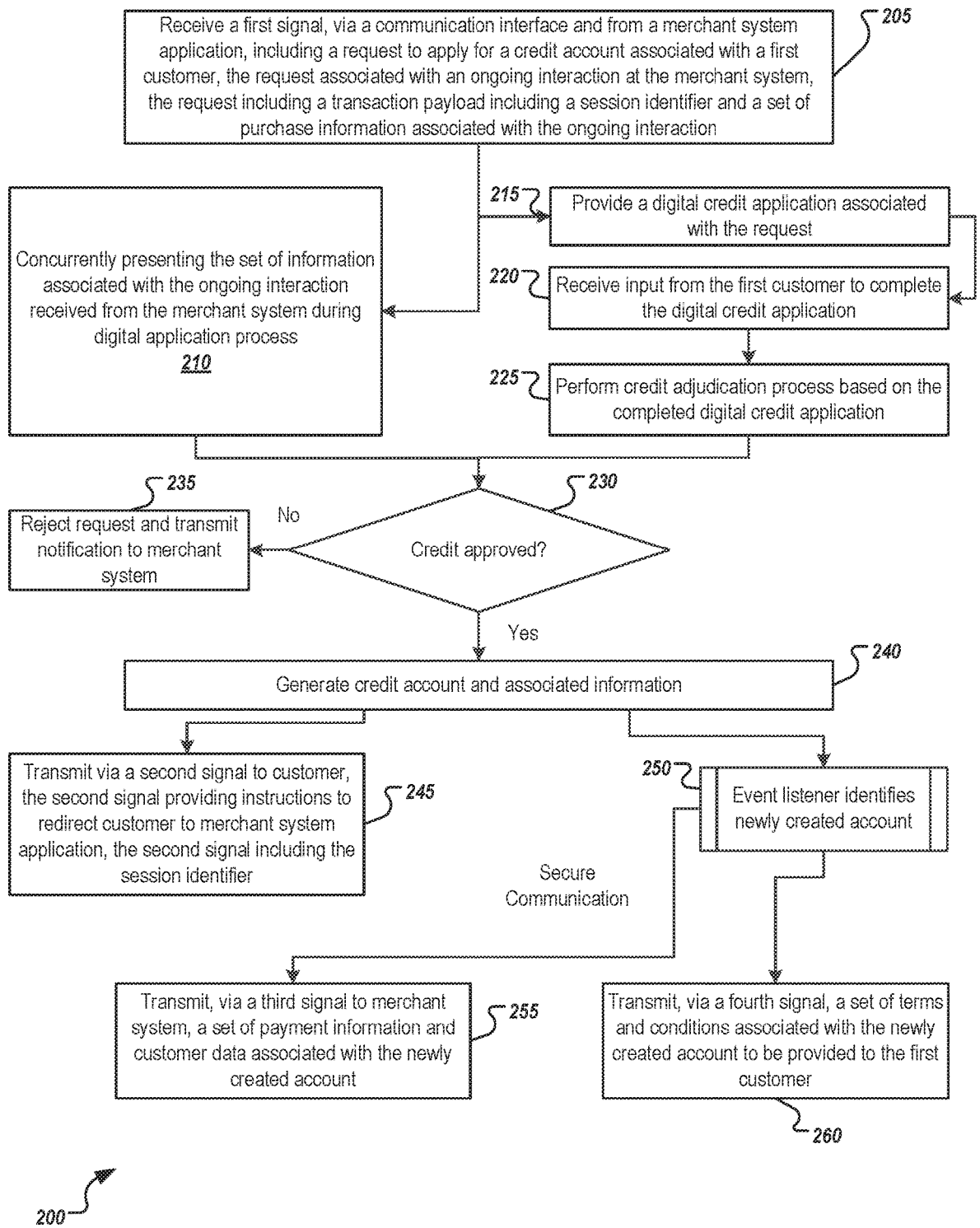
FIG. 2 is a flow diagram of an example method for integrating immediate credit application processes and decisions via a financial institution into ongoing transactions performed at a merchant system from a perspective of a financial system in one example implementation.

FIG. 2 is a flow diagram of an example method for integrating immediate credit application processes and decisions via a financial institution into ongoing transactions performed at a merchant system from a perspective of a financial system in one example implementation. However, it will be understood that method 200 may be performed, for example, by any other suitable system, environment, software, and hardware, or a combination of systems, environments, software, and hardware as appropriate.

At 205, a first signal is received via a communication interface and from a merchant system associated with an e-Commerce solution. The first signal includes a request to apply for a credit account associated with the first customer, where the request is associated with an ongoing interaction at the merchant system. The request can include a transaction payload, where the transaction payload includes a session identifier (ID) and a set of transaction or purchase information associated with the ongoing interaction. The session ID is used to uniquely identify and link the ongoing interaction, which may be a transaction or purchase performed by the first customer at the merchant system. The set of transaction information can include information identifying the particular goods or services in a shopping cart associated with the first customer. The transaction information can include specific information about those goods or services, including pricing information, a total of all goods or services in the shopping cart, details about the items themselves (e.g., descriptions, travel details, model information, etc.) that can be used and presented to the first customer when interacting with the financial system and applying for a credit account to be used in the transaction.

At 210, in response to receiving the request, the set of transaction information can be presented during the digital credit application process. Presentation of the set of transaction information can include presenting the information in the same page or display as the digital credit application being completed, providing an overlay over a page or display in which the digital credit application is being completed, or any other suitable concurrent presentation. In providing the transaction information, the first customer can visualize the transaction and related details while the credit application is submitted, allowing a clearer goal as relates to the credit.

While the set of transaction information is being presented, a digital credit application associated with the request is generated and provided at 215. At 220, input can be received from the first customer to complete the digital credit application. In some instances, some of the inputs may be pre-filled in the digital credit application based on information included in the request. In some instances, that information may include personal identifying information (PII), such as addresses, contact numbers, and other information stored at the merchant system. The first customer may be able to opt-out of the sharing of such data. Additionally, information about a particular loyalty account number associated with the merchant system, including a user login name or other identifying information, can be shared and/or including in the digital credit application. Once complete, at 225 a credit adjudication process based on the completed digital credit application can be performed to determine the first customer's creditworthiness. Any suitable adjudication process may be performed, and in some cases, additional information may be requested and/or required before a decision is made.

At 230, a determination is made as to whether the request for credit has been approved. If the request is denied, method 230 can continue at 235, where the request is rejected. In some instances, the customer may be redirected back to the merchant system, and a suitable rejection notification can be presented. In some instances, the merchant system may receive a notification of the rejection, where the merchant system can then ask for or require a different method of payment from the first customer. If the credit application is approved, method 200 can continue at 240, where a corresponding credit account and associated account information can be generated based on the information included in the credit application and the creditworthiness analysis.

After the account is generated, two sets of actions may occur, whether simultaneously, concurrently, or sequentially. In any of those, the result is that the payment information associated with the newly opened credit account can be made available in real-time or near-real-time to allow for use of the payment information in the ongoing interaction at the merchant system.

At 245, a second signal can be transmitted to the customer or an executing application associated with the customer, where the second signal includes instructions to redirect the customer from the financial application and the digital credit application back to the merchant system associated with the ongoing interaction and transaction. The instructions and/or second signal can be associated with the session ID corresponding to the first customer and their ongoing interaction, where that session ID is passed back to the merchant system in order to allow the state from which the interactions of method 200 originated to be recreated and/or restored. In some instances, the redirection can be to a first endpoint of the merchant system associated with a webpage, website, or web application, among others.

At 250, which again may occur concurrently, simultaneously, or sequentially, or very near the time of 245, an event listener associated with the financial system can identify that a new account is created. The event listener can be a part or functionality of the financial system, a separate agent or application managed by or associated with the financial system, or a third-party component. In any event, in response to the event listener identifying the newly created account and information associating that account with at least one customer account, at 255 a third signal can be generated and securely transmitted via the communication interface to the merchant system with a set of payment information and customer data associating the payment information to a particular customer account. The secure transmission can be sent to a second endpoint of the merchant system in some instances, where the second endpoint is different than the first endpoint. In some instances, the second endpoint may be associated with a secure communication channel, or may be associated with a private API available for sharing the payment information. Once the payment information is received, the merchant system can associate it with the corresponding account. In some instances, the customer data can include an identifier of a particular loyalty account at the merchant system associated with the first customer. In other instances, a login name or other identifier, including the session ID, can be provided with the third signal to allow the merchant system to connect the payment information to the customer account of the first customer.

At 260, the event listener can also cause a fourth signal to be generated and transmitted to the first customer, where the fourth signal is associated with a set of terms and conditions associated with the newly created account. In some instances, the event listener can trigger a digital communications service to initiate the transmission of the terms and conditions to the first customer. For example, a notification of the new account can be provided to the digital communications service, and the digital communications service can then prepare and transmit the correspondence through any suitable communication channel. In some instances, the transmission may include email, text or another messaging service's message, a secure message provided through a dedicated financial application or app, a pop-up or interstitial presentation on the device in which the first customer is interacting with the merchant and financial systems, or any other suitable means. By providing such terms and conditions, the financial system can ensure that any and all legal and regulatory notifications and information are sent in connection with the new account, and can provide a convenient way to review the information for the first customer.

Figure 3:
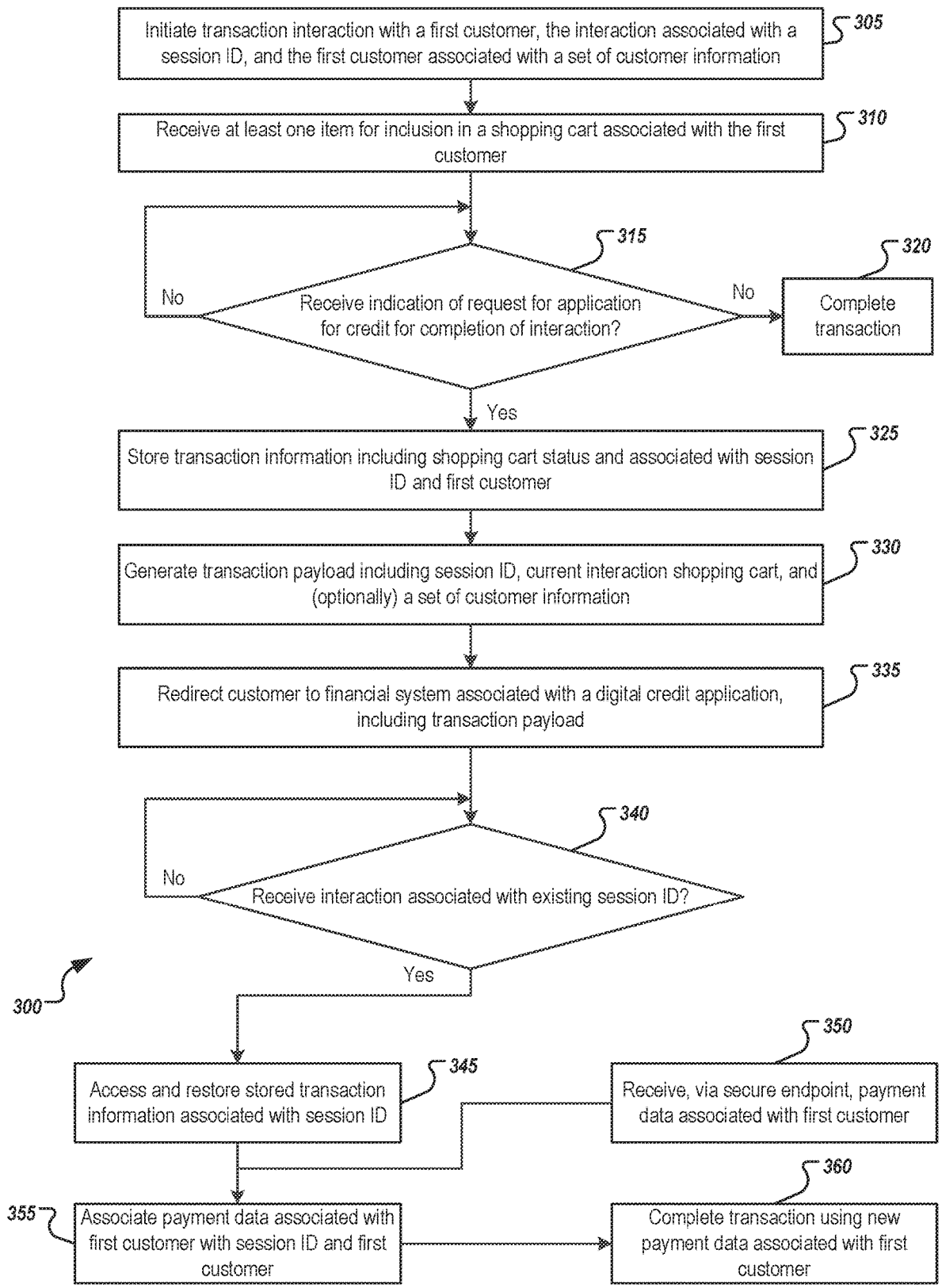
FIG. 3 is a flow diagram of an example method for integrating immediate credit application processes and decisions via a financial institution into ongoing transactions performed at a merchant system from a perspective of a merchant system in one example implementation.

FIG. 3 is a flow diagram of an example method 300 for integrating immediate credit application processes and decisions via a financial institution into ongoing transactions performed at a merchant system from a perspective of a merchant system in one example implementation. However, it will be understood that method 300 may be performed, for example, by any other suitable system, environment, software, and hardware, or a combination of systems, environments, software, and hardware as appropriate.

At 305, a transaction interaction is initiated with a first customer, such as for shopping for goods or services. The interaction can be associated with a unique session identifier (ID), which can be used to store transaction state information. The first customer can be associated with a set of customer information, which can include, in some instances, a loyalty or login account, demographic information, personally identifiable information (PII), and other data or information. The transaction interaction can be associated with an e-Commerce site, application, or program at a merchant system.

At 310, at least one item can be identified or received as an item to be added to a shopping cart or wish list associated with the first customer. The items can be added to the cart during the first customer's visit to an e-Commerce or web site associated with the merchant system, and may include goods, services, or a combination thereof. In some examples, the merchant system may be an airline, where tickets for a particular flight or flights can be added to the shopping cart or corresponding account. In another example, the merchant system may be an online retailer selling electronics and home goods. Any other type of merchant with an online and e-Commerce presence may use the solution described herein. The transaction may continue, and at 315, a determination can be made whether an indication of a request for an application for credit is received to be used for completion of the transaction. If not, the transaction can continue and return to 310 (not shown), or can be completed via other payment means or methods at 320. If, however, a request for a credit application is received, method 300 continues to 325. In some instances, the request for credit can be provided as a button or payment option during the transaction.

At 325, transaction information associated with current ongoing interaction can be stored and associated with the session ID. The session ID can be generated initially when an interaction begins, or may be assigned just prior to a redirection to the financial system. The transaction information associated with the session ID can include a shopping cart status, including any items that may have previously been added by the first customer. The session ID itself can also be associated with the first customer, and can allow for the state of the transaction to be restored at a later time.

At 330, a transaction payload can be generated, where the transaction payload can include the session ID of the ongoing interaction and information related to the set of items and related information in the shopping cart. In some instances, a set of relevant customer information may also be added to the transaction payload, and can include customer account information stored by the merchant system including but not limited to loyalty account information, demographic information, address and personally identifiable information (PII), and other data. The customer information can be used to pre-fill a credit application as well as to link a new credit application to an existing customer account at the merchant system. In doing so, redirections from and information associated with the financial system can be linked to particular merchant customer accounts, assisting in seamless transitions between the financial system and the merchant system.

At 335, the first customer can be redirected to the financial system associated with the digital credit application. In some instances, the redirection may occur, as well as the indication of the request for credit, after an interactive UI element associated with the financial system is activated, which can trigger navigation to the digital credit application along with the generated transaction payload, as well as the operations of 325 and 330. In other instances, a UI element or other interaction may identify that a request for credit is to be performed, and the corresponding operations can be performed. The merchant system may then wait for further interactions.

At 340, a determination is made as to whether an interaction associated with an existing session ID is received. If not, method 300 waits until the interaction is received. Because the merchant system can manage multiple concurrent interactions with different customers, one or more sessions and interactions may occur. The operations of method 300 are associated with the first customer, although multiple interactions and redirections can occur. In some instances, the determination at 340 that an interaction associated with an existing session ID may be associated with a transaction different than the previously described session ID, such that another customer may be associated with the interaction. If the interaction is associated with an existing session ID, method 300 can continue at 345. The interaction may be received directly from a redirection action performed by the financial system, where the credit application is completed. The interaction or redirection received from the financial system may, in some cases, include additional customer information, such as information to confirm that the session ID is associated with the first customer.

At 345, information about the stored transaction information associated with the received session ID can be accessed and restored, including the addition of one or more items to the current shopping cart of the first customer.

At 350, which can occur separate from the received interaction (but in connection with credit approval and opening at the financial system), and which may occur concurrently with 340 and/or 345, before 340 and/or 345, or after 340 and/or 345, payment data associated with the first customer and the new credit account can be received via a secure endpoint and/or via a secure channel. By providing a secure endpoint or channel, the merchant system can securely receive payment information about the newly created credit account from the financial system while avoiding potential data leaks. In some instances, in response to receiving the payment information, the merchant system can send the payment information to a tokenization service, which can tokenize the payment information and return a payment token.

At 355, the payment data, which may be the generated payment token, can be associated with the first customer at the merchant system. In some instances, the payment data can be associated with the first customer during or in near-real-time to the restoration processes of 345, such that the payment data is available for use when the prior transaction is restored. At 360, the restored transaction is available to be completed with the new payment data (e.g., a generated payment token) associated with the first customer, and the transaction can be completed.

Figure 4:
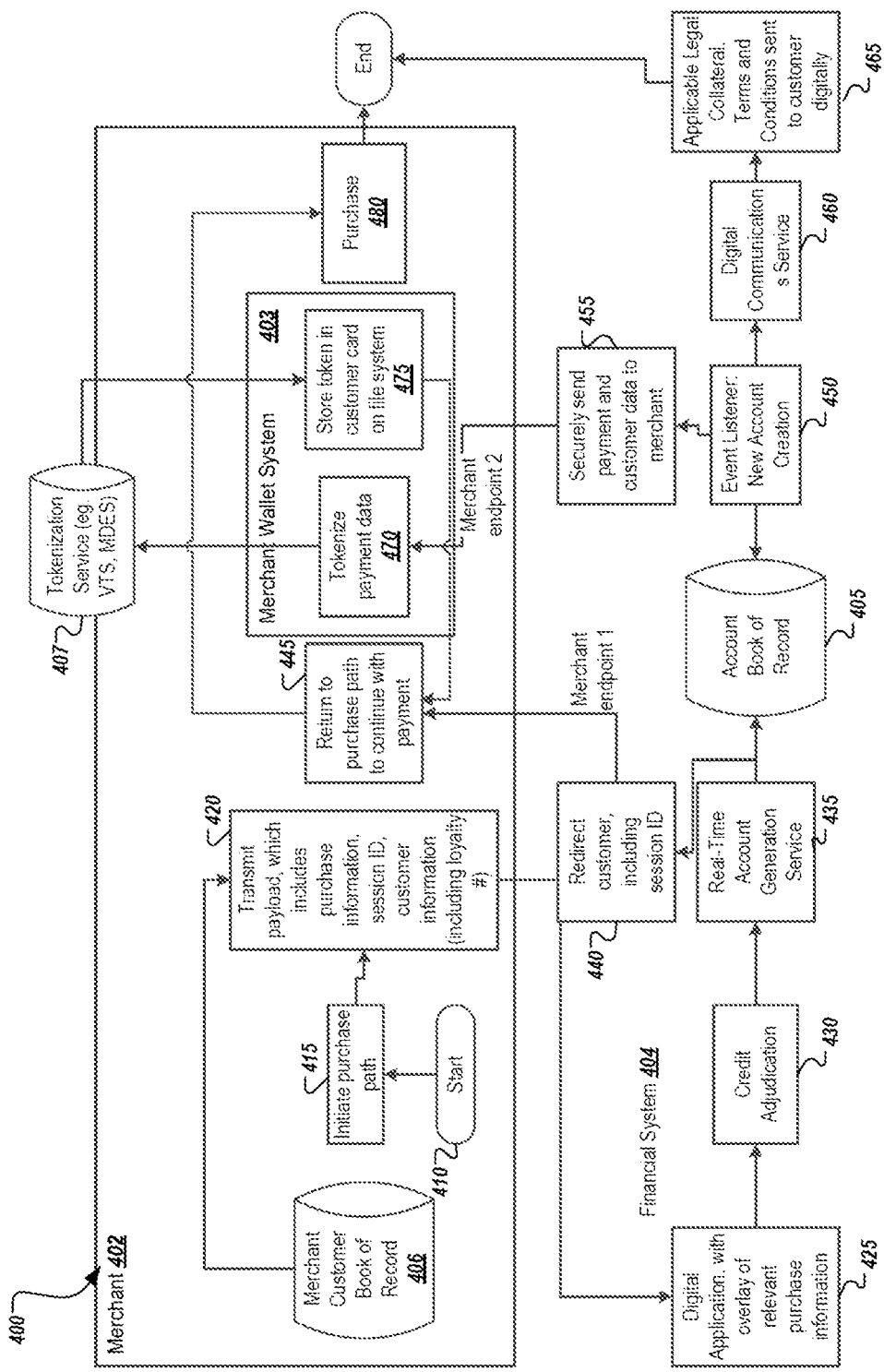
FIG. 4 illustrates a data and control flow of example interactions performed in integrating immediate credit application processes and decisions via a financial institution into ongoing transactions performed at a merchant system in one example implementation.

FIG. 4 illustrates a data and control flow 400 of example interactions performed in integrating immediate credit application processes and decisions via a financial institution into ongoing transactions performed at a merchant system in one example implementation. As shown, FIG. 4 is illustrated with interactions between a merchant system 402 (and its merchant wallet system 403) and a financial system 404. The merchant system 402 can interact with a tokenization service 407 to perform an optional tokenization operation. Although not illustrated, the merchant system 402 and the financial system 404 can interact with a client device, such as through the client device's web browser and/or related dedicated applications. As illustrated, the merchant system 402 can be associated with a merchant customer book of record 406, which can manage information about the merchant's customers, including loyalty information, demographic information, and other customer-related and -relevant data. Similarly, the financial system 404 is associated with an account book of record 405, which may be managed directly by the financial system 404 or by a third party, where appropriate. The account book of record 405 can store information on new and existing customer accounts, including new credit accounts opened during the interactions described herein. In some instances, these may correspond to the financial system 102, merchant system 150, and tokenization service 180 of FIG. 1, respectively, although different specific implementations may be used by persons of skill in the art.

At 410, a user or customer can initiate an interaction with the merchant 402, such as through an e-Commerce web page, application, or other suitable interface. In some instances, a session ID can be uniquely generated for each customer interaction so that information can be stored and referenced later. In some instances, the session ID can be generated immediately at the start of a new interaction. In other instances, the session ID can be generated in response to a first item being added to a shopping cart at the merchant system 402, or in response to an indication of a request for new credit during the interactions at the merchant system 402. At 415, a purchase path can be initiated and/or created, where the purchase path entails or includes the addition of one or more items (e.g., goods and/or services) to a shopping cart or other list of items for purchase at the merchant system 402. After the addition of items, customers may be presented with an offer to request a new credit account to purchase the items in the shopping cart. In some instances, the offer may be associated with an activatable UI object or element, which can be activated to request the credit line.

In response to an indication of a request for credit, a payload is generated at 420 and transmitted to the financial system 404. The payload 420 can include, for example, the set of purchase information associated with the current interaction (e.g., the items of the shopping cart, plus optionally additional information or details associated with them), the session ID of the current interaction, and, optionally, a set of customer information (e.g., a merchant loyalty number or customer account information). Information about the customer can be obtained from the merchant's customer book of record 406, and can be included in the payload. Once the payload is generated, as noted, a transmission to the financial system 404 can be initiated. In some instances, a redirection to the financial system 404 can be performed by causing the customer's web browser to redirect from a webpage associated with the merchant system 402 to a webpage associated with the financial system 404 and its digital credit application.

At 425, the digital credit application associated with the financial system 404 can be presented. In combination with the application, which may be pre-filled with at least some of the information included in the transmitted payload from 420, a presentation of the relevant purchase information included in the payload can be presented concurrently with the customer's completion of the digital credit application. The presentation may be presented as an overlay of the digital credit application, a presentation on top, to the side, or below the credit application fields, or an additional window or tab area where the purchase information is available. The sharing of such information may also include a set of stylistic information about how the credit application should be presented, where the credit application is presented in a format similar to that provided at the merchant system 402 for the purchase interactions.

Once the credit application is completed, at 430 a credit adjudication process is performed. If the customer is approved for credit, at 435, a real-time account generation service can create the approved account, and add that account information to the account book of record 405. The account book of record 405 can incorporate any available information associated with the account, including any information about the customer account at the merchant system 402, thereby allowing the accounts to be tangentially linked. In some instances, only a session ID may be associated with the new account, although the session ID can be interpreted by the merchant system 402 to determine the corresponding customer account. Once the new account is generated, the financial system 404 can redirect the customer at 440, where the redirection includes the session ID. The redirection can send the customer to a first merchant endpoint associated with the e-Commerce or other application at which the initial purchasing interactions occurred.

At 445, using the session ID received with the redirection, the merchant system 402 can return to the purchase path previously started (at 415) by restoring the session state corresponding to the session ID. The session state can be stored in any suitable memory or repository, and can be accessed during the redirection.

In parallel with the redirection, an event listener can monitor and detect new account creations at 450. In response to identifying the new accounts, the event listener can perform two actions as illustrated. In a first action, the event listener can identify the new account that is created, and, at 455, securely transmit a set of payment information corresponding to the new account to the merchant system 402, where the set of payment information is also associated with a customer identifier or customer-associated information from the account book of record 405. In some instances, that account information may include a loyalty number or other customer account identifier (e.g., a username) that uniquely identifies the customer at the merchant system 402. Alternatively, a set of information may be used to allow the merchant system 402 to derive the particular customer associated with the information. The secure transmission of 455 can be transmitted securely (e.g., via encryption, encoding, etc.) and/or to a private endpoint associated with the merchant system 402. The endpoint to which the payment data is transmitted can be different than the endpoint to which the redirection is sent.

The merchant wallet system 403 (or another portion or agent of the merchant system 402) can receive the secure payment information and associate that information with the corresponding customer account. As illustrated, the received payment information can be tokenized at 470, where tokenization includes providing the payment information to a tokenization service 407, which can generate a payment token that can be used in lieu of the payment information provided at 455. Once the payment token is created and received back at the merchant wallet system 403, the payment token can be stored in a set of customer card on file data within the merchant wallet system 403 at 475, and can be available for immediate use. Based on the concurrent and/or simultaneous operations of the redirection and token generation, the payment token may be available at the same time as the restoration of the purchase path and session state. In any event, once the payment token is available, the customer can complete the transaction by moving to 480, where the stored token can be used to complete the purchase.

Returning to 450, in addition to the secure transmission of the payment data at 455, the event listener can also initiate or trigger operations of a digital communications service at 460. The digital communications service can initiate and manage the provision of any related legal information, including terms and conditions, related to the new credit account. That information can include finance charges, interest rates, credit available, and other relevant information, and may be required by legal and/or regulatory authorities. The information can, in many jurisdictions, be provided digitally. In those instances, the digital communications service can transmit the information to the customer digitally (e.g., via email, text message, secure financial application messaging, or any other digital channel or interaction), or alternatively, can initiate the physical sending of any applicable information, where appropriate.

FIGS. 5A and 5B illustrate example screenshots associated with the described solution. FIG. 5A illustrates a screenshot associated with a customer's interactions with the website of Example Airlines, both as a website or tablet-based interaction (500A), as well as an illustration on a smartphone (500B). During interactions with the Example Airlines site, the customer has added a flight from Toronto (YYZ) to London (LHR) for a price of $988.00, with a departure date of Jun. 11, 2020 (shown in 502A/B). After selecting seats and moving through the process, the corresponding ticket is on hold and the customer is ready to pay for the tickets. The customer has a first option to pay using an existing credit card that may be already associated with Example Airlines' digital wallet and the customer's loyalty account, represented by a first button 505A/B. As a second option, the customer has the option to apply for a new Airline-branded credit card by interacting with a second button 510A/B. If the customer chooses to apply for the new Airline-branded credit card and clicks on button 510A/B, then, as described, the customer can be redirected to the financial system's credit application and associated web page, illustrated in FIG. 5B.

FIG. 5B, as noted, illustrates a screenshot of a presentation of a website or web application associated with a financial system after the customer has been redirected from the merchant's site (here, Example Airlines). Here, information associated with the tickets on hold have been transmitted to the financial system, along with a session ID and some information about the customer, and the financial system has generated a new application for credit, along with at least some information about the customer being pre-filled, either from information received from the merchant or from information already stored at the financial system.

As illustrated, the look and feel of the site may be similar to that of Example Airlines, even though the actual page is provided and managed by the financial system, which may not be related to the Example Airlines, but which has been presented to provide the customer with the feel of the Example Airlines site. As in FIG. 5A, a desktop or tablet version 515A and a mobile device version 515B are provided in FIG. 5B. As noted, information about the pending purchase at the merchant site can be shared during the redirection process, and information about the purchase can be presented at an overlay or purchase presentation in 520A/520B. A button 525A/B allowing customers to return to the merchant site can be provided, allowing for an easy return to the merchant without requiring the application to be completed or submitted. Below the overlay or presentation related to the pending purchase (520A/B), a new credit application (530A/B) is presented. In some instances, at least some of the information can be obtained from the merchant system, including basic customer information and a customer account number associated with the merchant. Here, that information is a first and last name 535A of the customer, as well as the customer's loyalty member ID 545A. Some fields have not been completed, and must be completed by the customer to process the application, such as the address and social security number fields 540A. Additional fields may need completion in various implementations.

Once complete, a submit application button 550A/B can be activated, submitting the application for adjudication and, if approved, credit creation. From there, the customer can be redirected back to the merchant's page, and the payment information can be added to the merchant's digital wallet as described above.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   at least one memory storing instructions and a repository for storing a set of credit accounts, each credit account associated with a user;
   at least one hardware processor interoperably coupled with the at least one memory, wherein the instructions instruct the at least one hardware processor to:
      receive, during an ongoing transaction at a second system, a first signal including a request to initiate an application for a new credit account for a first user, wherein the request associated with the ongoing transaction at the second system, the request including a payload including a session identifier (ID) of the ongoing transaction and a set of transaction information identifying at least one item associated with the ongoing transaction, and the session ID is associated with a particular state of the ongoing transaction at the second system;
      provide, via a user interface and after the first user is transferred away from the second system, a digital credit application associated with the received request, wherein providing the digital credit application includes concurrently providing at least a subset of the set of transaction information identifying the at least one item associated with the ongoing transaction;
      in response to completion of the digital credit application, perform a credit adjudication process based on a set of application data associated with the first user;
      in response to an approval during the credit adjudication process, create a new credit account associated with the first user, the new credit account associated with a set of payment information;
      transmit, through a first communication channel, a second signal including an instruction to redirect the first user to the second system, the second signal including the session ID of the ongoing transaction at the second system;
      in response to the new credit account associated with the first user being created, transmit, through a second communications channel, a third signal including a set of payment information associated with the new credit account to the second system, wherein the first communications channel and the second communications channel are different; and
      wherein after executing the instruction to redirect the first user to the second system, the first user is returned to the second system and the particular state associated with the session ID is restored at the second system.

2. The system of claim 1, wherein the second system includes a merchant system, wherein the ongoing transaction at the merchant system comprises a purchase being performed by the first user.

3. The system of claim 2, wherein the first signal is transmitted in response to the first user indicating a request for a new credit account to be used to complete the purchase being performed by the first user.

4. The system of claim 3, wherein the third signal includes information associated with the first user, wherein the set of payment information associated with the new credit account is associated with a customer account of the first user at the merchant system.

5. The system of claim 4, wherein, after the set of payment information is associated with the customer account of the first user at the merchant system, the set of payment information is tokenized.

6. The system of claim 4, wherein the third signal is transmitted at a same time as a second signal, such that the set of payment information is associated with the customer account of the first user at the merchant system is provided at the same time as the redirection of the first user to the second system.

7. The system of claim 2, wherein the second communications channel comprises a secure interface via which information is securely transmitted to the merchant system, wherein the secure interface comprises a connection to an application programming interface (API) of the merchant system.

8. The system of claim 1, wherein the instructions instruct the at least one hardware processor to:
   in response to the new credit account associated with the first user being created, transmit, through a third communications channel to a user device associated with the first user, a fourth signal including a set of terms and conditions associated with the new credit account.

9. The system of claim 1, wherein the first signal is received from a client application at a user device associated with the first user executing an e-Commerce application associated with the second system.

10. A non-transitory, computer-readable medium storing computer-readable instructions executable by a computer and configured to:
    receive, during an ongoing transaction at a second system, a first signal including a request to initiate an application for a new credit account for the first user, wherein the request associated with the ongoing transaction at the second system, the request including a payload including a session identifier (ID) of the ongoing transaction and a set of transaction information identifying at least one item associated with the ongoing transaction, and the session ID is associated with a particular state of the ongoing transaction at the second system;

provide, via a user interface and after the first user is transferred away from the second system, a digital credit application associated with the received request, wherein providing the digital credit application includes concurrently providing at least a subset of the set of transaction information identifying the at least one item associated with the ongoing transaction;

in response to completion of the digital credit application, perform a credit adjudication process based on a set of application data associated with the first user;

in response to an approval during the credit adjudication process, create a new credit account associated with the first user, the new credit account associated with a set of payment information;

transmit, through a first communication channel, a second signal including an instruction to redirect the first user to the second system, the second signal including the session ID of the ongoing transaction at the second system;

in response to the new credit account associated with the first user being created, transmit, through a second communications channel, a third signal including a set of payment information associated with the new credit account to the second system, wherein the first communications channel and the second communications channel are different; and wherein after executing the instruction to redirect the first user to the second system, the first user is returned to the second system and the particular state associated with the session ID is restored at the second system.

11. The non-transitory, computer-readable medium of claim 10, wherein the second system includes a merchant system, wherein the ongoing transaction at the merchant system comprises a purchase being performed by the first user.

12. The non-transitory, computer-readable medium of claim 11, wherein the first signal is transmitted in response to the first user indicating a request for a new credit account to be used to complete the purchase being performed by the first user.

13. The non-transitory, computer-readable medium of claim 12, wherein the third signal includes information associated with the first user, wherein the set of payment information associated with the new credit account is associated with a customer account of the first user at the merchant system.

14. The non-transitory, computer-readable medium of claim 13, wherein, after the set of payment information is associated with the customer account of the first user at the merchant system, the set of payment information is tokenized.

15. The non-transitory, computer-readable medium of claim 13, wherein the third signal is transmitted at a same time as a second signal, such that the set of payment information is associated with the customer account of the first user at the merchant system is provided at the same time to the redirection of the first user to the second system.

16. The non-transitory, computer-readable medium of claim 11, wherein the second communications channel comprises a secure interface via which information is securely transmitted to the merchant system, wherein the secure interface comprises a connection to an application programming interface (API) of the merchant system.

17. The non-transitory, computer-readable medium of claim 10, wherein the instructions are configured to:

in response to the new credit account associated with the first user being created, transmit, through a third communications channel to a user device associated with the first user, a fourth signal including a set of terms and conditions associated with the new credit account.

18. A computerized method performed by one or more processors, the method comprising:

receiving, during an ongoing transaction at a second system, a first signal including a request to initiate an application for a new credit account for the first user, wherein the request associated with the ongoing transaction at the second system, the request including a payload including a session identifier (ID) of the ongoing transaction and a set of transaction information identifying at least one item associated with the ongoing transaction, and the session ID is associated with a particular state of the ongoing transaction at the second system;

providing, via a user interface and after the first user is transferred away from the second system, a digital credit application associated with the received request, wherein providing the digital credit application includes concurrently providing at least a subset of the set of transaction information identifying the at least one item associated with the ongoing transaction;

in response to completion of the digital credit application, performing a credit adjudication process based on a set of application data associated with the first user;

in response to an approval during the credit adjudication process, creating a new credit account associated with the first user, the new credit account associated with a set of payment information;

transmitting, through a first communication channel, a second signal including an instruction to redirect the first user to the second system, the second signal including the session ID of the ongoing transaction at the second system; and in response to the new credit account associated with the first user being created, transmitting, through a second communications channel, a third signal including a set of payment information associated with the new credit account to the second system, wherein the first communications channel and the second communications channel are different; and wherein after executing the instruction to redirect the first user to the second system, the first user is returned to the second system and the particular state associated with the session ID is restored at the second system.

* * * * *